Aug. 19, 1952      P. ORR      2,607,458
BLOCKER TYPE CLUTCH
Filed Dec. 22, 1948
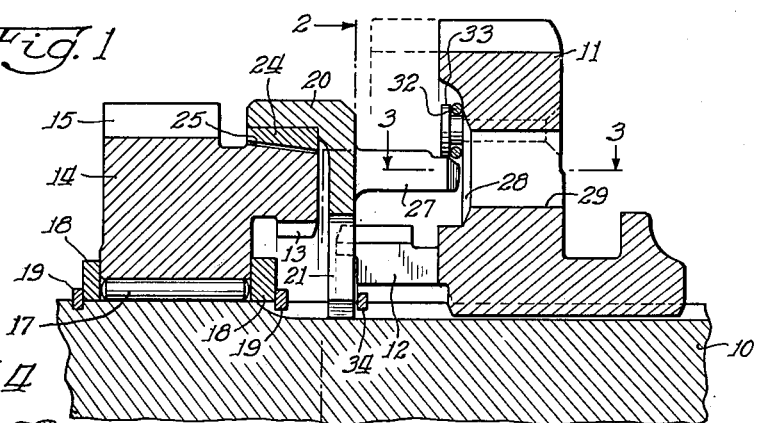
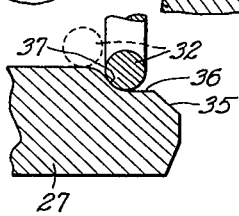
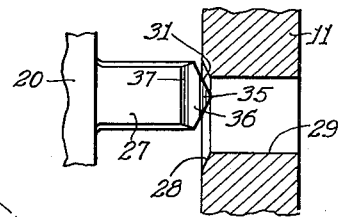
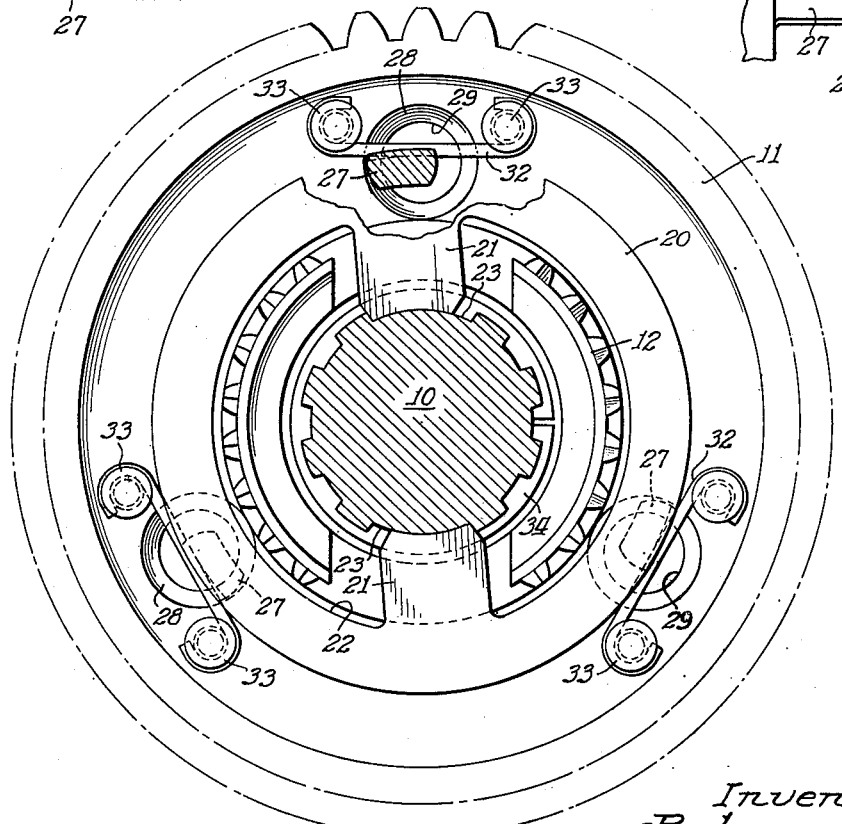
Inventor:
Palmer Orr
By Edward ...

Patented Aug. 19, 1952

2,607,458

UNITED STATES PATENT OFFICE 2,607,458

BLOCKER TYPE CLUTCH

Palmer Orr, Muncie, Ind., assignor to Borg-Warner Corporation, Chicago, Ill., a corporation of Illinois Application December 22, 1948, Serial No. 66,653

6 Claims. (Cl. 192—53)

This invention relates to transmissions and more particularly to a mechanical power transmission incorporating among other improvements a novel synchronizer mechanism whereby the power transmitting members of the transmission may be caused to rotate at substantially equal speeds prior to being intermeshed.

In transmissions of the type employing blocker synchronizers, it is necessary that there be a frictional contact between the friction face of the synchronizer drum and the friction face of the companion member, associated with one of the gears to insure dragging the drum substantially to the limit of its angular adjustability on the splined shaft on which the drum is pivoted. This displacement of the drum provides the required initial alignment of the blocker faces whereby the drum may be pressed into contact with the companion member with sufficient force to establish synchronization. As is well known, once synchronization is established, the blocker faces move out of alignment and the frictional contact between the drum and the companion member is substantially removed.

The initial alignment of the blocker faces is usually established by the drag of the oil film between the friction surfaces of the companion member and the synchronizer drum. In some cases, however, the drag of the oil film between the friction surfaces is inadequate to provide the required initial rotation of the synchromizer drum without added axial pressure. Thus, for example, because of variations in the thickness of the oil film due to the variation of the oil viscosity and other film characteristics of the oil in use, the drag provided by the oil is not of uniform value at all times and under certain conditions, particularly when hot, may be wholly inadequate. Under such conditions, it is possible for the blocker faces not to be aligned as the shifting mechanism is operated and axial pressure is to be applied to the synchronizer drum to cause it to engage its companion member. Under these conditions, no pressure is applied to the synchronizer drum; consequently, there is no synchronization and the gears clash.

In order to avoid such erratic operation in blocker type synchronizers, one practice has been to employ a suitable spring arrangement to exert a constant axial pressure on the synchronizer drum urging it into contact with the companion member of the gear to be synchronized, the spring providing sufficient frictional engagement to insure the requisite drag at all times. While the use of such a spring is relatively effective, this practice is objectionable because the constant frictional engagement, while not great, represents an undesirable power loss and involves constant wear, thereby reducing the useful life of the synchronizer. In order to overcome these objectionable characteristics, it has been suggested that a resilient member be provided which is engaged only during the initial shifting movement to produce the requisite drag. With this latter type of arrangement, the requisite drag is only established for a moment, instead of being continually present as with the constant pressure spring. For this reason, the latter arrangement is preferred in principle. However, heretofore it has been found in practice that it is extremely difficult to design a transmission in which the synchronizer drag is established only intermittently, as required, and yet the synchronizer arrangement will consistently provide the required degree of axial pressure, without resorting to expensive and unduly complicated arrangements.

An object of the present invention is to provide a new and improved transmission and particularly a synchronizer mechanism capable of consistent and effective operation.

A further object of the present invention is to provide a transmission having a blocker type synchronizer arranged to consistently provide the drag necessary to establish the initial alignment of the synchronizer blocker faces.

In accordance with one embodiment of this invention, the synchronizer drum is provided with a plurality of axially extending blocker stubs which are adapted to engage the chamfered faces of the entrances of corresponding, axially extending apertures formed in the shiftable gear to provide blocker action, the stubs entering the apertures and relieving the pressure on the synchronizing surfaces once synchronization is established. In order to insure sufficient drag to cause the synchronizer drum to be angularly displaced to the limit of its rotatability on the supporting splined shaft and thereby to cause the ends of the stubs to seat initially on the chamfered faces, a resilient member is associated with each aperture of the shiftable gear and partially obstructs the entrance to the aperture. The resilient member is initially engaged by a cam surface formed adjacent the terminal end of the associated stub and the resilient member is so positioned with respect to the blocker faces as to cause the synchronizer drum to be pressed into contact with its companion member prior to the stubs touching the blocker faces at the entrances of the apertures. This initial contact between the synchronizing surfaces is sufficient to cause the ring to rotate relatively to the gear and to establish the desired alignment of the blocker faces and the stubs. Continued shifting movement by the operator causes the resilient members to be deformed and to ride over the cam surfaces on the blocker stubs and then the usual blocker action takes place.

Other objects and advantages of the present invention will be apparent from the following detailed description taken in conjunction with the drawings wherein:

Fig. 1 is a fragmentary, axial, sectional view of a transmission incorporating a synchronizer constructed in accordance with the invention;

Fig. 2 is a sectional view taken along the line 2—2 of Fig. 1;

Fig. 3 is an enlarged, sectional view taken along the line 3—3 of Fig. 1 showing the relative positions of the blocker faces during alignment; and Fig 4 is an enlarged, detailed view illustrating the configuration of the end of the blocker stub and mode of engagement with the spring member carried by the shiftable gear.

Referring now to the drawings and particularly to Figs. 1 and 2 thereof, a transmission is there illustrated including a main driving shaft 10, which may for example be the driving shaft of an automobile transmission. The right portion of the shaft 10 is splined and has keyed thereto a large driving gear 11 which is axially shiftable on the shaft 10 by suitable means such as a shifting fork (not shown). The driving gear 11 has integrally formed therewith on the left side thereof a two sector, hub gear 12 comprising one of two positive clutch members, and by shifting the driving gear 11 to the left, the hub gear 12 may be caused to engage the teeth of an internal gear 13 comprising the second of the two positive clutch members. The gear 13 is integrally formed with a driven gear 14 having external teeth 15 which may be meshed with a third gear (not shown). The driven gear 14 is rotatably supported on the main shaft 10 by bearing assembly 17 and is prevented from moving axially of the shaft 10 by retaining rings 18 positioned at either end of the bearing assembly 17 and suitable split rings 19 carried by the shaft 10.

In order to synchronize the rotational speed of the driving gear 11 and the gear 14 so that the teeth of the hub gear 12 will not clash as they are meshed with the internal gear 13, a synchronizer drum 20 is provided and is positioned between the gear 11 and the gear 14, being piloted on the splined portion of the shaft 10 by a pair of oppositely disposed, inwardly extending spokes 21 integrally formed with the disc portion of the drum 20. The two sectors of the hub gear 12 are received in and move through the two open portions 22 on either side of the spokes 21 of the drum 20 when the gear 11 is shifted to the left.

As more clearly shown in Fig. 2, the spokes 21 have a substantially lesser width than the corresponding splined recesses 23 formed in opposite sides of the periphery of the shaft 10, thereby providing a limited freedom of movement so that the drum 20 may be rotated slightly with respect to the shaft 10, this angular adjustability being necessary to enable the required alignment of the blocker faces, as will be more fully described hereinafter. The synchronizer drum 20 has an internally disposed ring 24 which provides, in conventional manner, an internal conical friction face adapted to engage an external conical friction face 25 of the gear 14, as is clearly shown in Fig. 1.

In accordance with the present invention, blocker action is provided by a plurality of stub shafts 27, these stub shafts extending to the right, as viewed in Fig. 1 and being rigidly secured to or integrally formed with the right side of the synchronizer drum 20. In the embodiment illustrated, three blocker stubs are provided; however, it will be understood that a greater or lesser number may be employed as required. These blocker stubs are arranged to engage at their terminal ends chamfered, annular blocker faces 28 formed at the left ends of correspondingly positioned, axially extending apertures 29 formed in the driving gear 11. As more clearly shown in Fig. 3, the terminal end of each stub is wedge shaped to provide a pair of bevel faces 31, the bevel angle corresponding to the chamfer angle of the faces 28 of the apertures 29. Two bevel faces 31 are provided at the terminal end of the blocker stubs since synchronization is provided in either direction of rotation of the gear 11 relatively to the gear 14.

At the instant that the gear 11 is shifted toward the gear 14, it will be appreciated that the terminal ends of the blocker stub may be aligned with either set of the blocker faces of the apertures 29 so that a suitable blocking engagement is had. In such case no problem of alignment is present. However, it is possible that the synchronizer drum 20 will be rotated slightly from either limit of its travel with respect to the shaft 19 and the blocker faces then will not be completely aligned and inadequate frictional engagement will be had to establish the necessary synchronization. It is also possible that the blocker faces and the stubs will not be aligned at all, that is to say, the stubs will be aligned with the apertures 29 and pass into these apertures as soon as the gear 11 is shifted. Under this circumstance, shifting the gear 11 toward the gear 14 provides no blocker action whatever. These possible erratic alignments of the blocker faces 28 and the terminal ends of the blocker stubs are wholly avoided in accordance with the present invention by providing rod-shaped springs 32 which extend across each of the apertures 29, as clearly shown in Fig. 2, and obstruct the entrance to the apertures. Each spring 32 is supported in position by a pair of spaced lugs 33, one of which is positioned on either side of the aperture 29 and both of which are located slightly outside of the chamfered faces 28 in such manner that the cross portion of the spring 32 is positioned slightly outside the axis, in a radial direction, of the associated aperture 29, the spring 32 lying in effect on a chord of the circular aperture. The ends of the springs are wrapped around the lugs to secure them thereto so that upon deflection of the cross portion of the spring by the blocker stub, suitable resistance to deflection is afforded.

As shown in Figs. 1 and 4, the upper side of the terminal end of each stub 27 is shaped to cooperate with the spring 32; thus the terminal end of each stub has provided thereon a sharply beveled portion 35, which leads to a dwell portion 36, formed on the upper side of the stub and having at its left end an upwardly curved cam surface 37 terminating at the left in the upper surface of the stub. The springs 32 and the terminal ends of the stubs 27, particularly the cam surfaces 37 thereof, cooperate to insure that upon the initial shifting movement of the gear 11 toward the gear 14, a sufficient pressure engagement is effected between the friction faces of the synchronizer ring and the gear 14 to cause the drum 20 to rotate the stubs 27 with respect to the apertures 29 to effect alignment.

To facilitate understanding of this invention, the shifting of the gear 11 toward the gear 14 will be described in several stages. In the first stage, the synchronizer drum 20 is riding loosely on the shaft 10 and the terminal ends of the stub shafts are slightly spaced from the springs 32, a split ring 34 fixed to the shaft 10 establishing the limit of rightward movement of the drum 20 and being so located that when the right sides of the spokes 21 bear against the ring 34, there is substantially no frictional engagement between the conical friction surfaces of the synchronizer. The synchronizer drum 20, of course, rotates with the shaft 10 beyond the limits of its angular adjustability thereon.

In the second stage of the shifting operation, as the gear 11 is shifted toward the gear 14 the sharply beveled surfaces 35 at the terminal ends of the stub shafts 27 engage the springs 32 briefly, as shown in Fig. 1, the beveled surfaces serving only to facilitate and to guide the movement of the springs 32 onto the dwell portions 36 of each of the stub shafts, thus giving the operator an indication, due to increased resistance to movement, that the stubs have been reached. In the third stage of the shifting movement, the cross portions of the springs 32, as shown in Fig. 4, are brought to bear against the cam surfaces 37 formed on the stubs 27 and continued shifting movement presses the synchronizer ring 24 into engagement with the conical surface 25, thereby dragging the drum 20 to the limit of its angular adjustability on the shaft 10 and aligning one set of the bevel faces 31 at the terminal ends of the blocker stubs with the corresponding chamfered faces 28 of the gear. The position of the cam surfaces 37 of each blocker stub 27 is so selected with reference to the location of the associated spring 32 and the location of the chamfered faces 28 that no engagement is had between the chamfered faces 28 and the beveled faces 31 of the terminal ends of the blocker stubs during this third stage of the shifting movement. Thus, when the springs 32 are brought to bear against the initial portion of the cam surfaces 37, these cam surfaces 37 provide in combination with the resistance to deflection of the springs 32 the requisite pressure of engagement of the synchronizer ring 24 and the friction face 25. This engagement of the synchronizer ring 24, with the conical surface 25, in producing the aforementioned dragging action, causes the drum 20 to rotate with respect to the shaft 10, the direction of rotation depending on the direction of rotation of the gear 14, or its speed of rotation relatively to that of the shaft 10. The drum rotates to the limit of its adjustability as established by the width of the splined grooves 23 formed in the splined shaft 10 and that of the cooperating spokes 21, thereby aligning bevel faces 31 at the terminal ends of the blocker stubs 27 with the corresponding chamfered faces 28 on one side of the apertures 29.

In the fourth stage of the shifting movement, as the gear 11 is shifted still farther to the left, the blocker faces 28 engage the bevel faces 31 and the usual blocker action ensues. The gear 14 is thereby synchronized with the rotation of the gear 11 and when this occurs, as is well known, the setting force developed by the differential rotation of the synchronizer elements disappears, permitting the blocker faces to break away. The stubs 27 are then cammed away from the blocker faces 28 and become aligned with the apertures 29. In the final stage, continued shifting movement of the gear 11 causes the stubs 27 to be received in the apertures 29 at the same time the hub gear 12 on the gear 11 meshes with the internal ring gear 13 integrally formed with the gear 14 establishing a positive driving connection between these two gears.

Where herein the various parts of the transmission have been referred to as being located in a right or a left position, it will be understood that this is done solely for the purpose of facilitating description, and such references relate only to the respective positions of these parts as shown in the accompanying drawings.

While but one embodiment of this invention has been shown and described, many modifications and changes may be made herein without departing from the spirit or scope of the present invention.

What is claimed is:

1. A transmission including a driven shaft, a first gear rotatable with said driven shaft and axially shiftable thereon, a second gear rotatable on said driven shaft and adapted to be engaged by said first gear, said second gear being held in fixed axial location on said driven shaft, a synchronizer drum splined on said driven shaft and capable of limited angular rotation with respect thereto, and located between the first gear and the second gear, an external friction surface on said second gear adapted to be frictionally engaged by a corresponding internal friction surface on the synchronizer drum, and means for rotating the synchronizer drum to the limit of its angular adjustability on the driven shaft prior to the first gear being shifted into engagement with the second gear, said means comprising a tension spring carried by the first gear and a blocker stub carried by said synchronizer drum and arranged so as to engage the spring as the first gear is shifted toward the second gear to provide an initial engagement between the synchronizer drum and the friction surface on the second gear whereby the synchronizer drum is rotated to the limit of its angular adjustability on the driven shaft and synchronization between the gears is effected, said first gear having an axially extending aperture therethrough, the spring being deflected by said blocker stub and the blocker stub passing through said aperture upon continued shifting movement of the first gear after synchronization between the gears is effected.

2. A synchronizer drum having a blocker stub rigidly secured thereto, the terminal end of said blocker stub being wedge-shaped to provide a pair of beveled blocker faces, a third bevel face being provided at the terminal end of said blocker stub and extending in a plane lying generally at right angles to said pair of bevel faces, a cam surface formed adjacent the terminal ends of said blocker stub and an intermediate dwell portion connecting said cam surface and said third bevel surface.

3. A transmission including a driven shaft, a first gear rotatable with said driven shaft and axially shiftable thereon, a second gear rotatable on said driven shaft and adapted to be engaged by said first gear, a synchronizer drum splined on said driven shaft and capable of limited angular rotation with respect thereto, and disposed between said two gears for establishing synchronization therebetween, a friction surface on said second gear being frictionally engaged by the synchronizer drum to effect synchronization, at least one blocker stub fixed to said synchronizer drum and extending therefrom toward said first gear, said first gear having a correspondingly positioned aperture formed therein to receive the blocker stub, and a tension spring located so as to obstruct said aperture, said spring being engageable by the terminal portion of said blocker stub during initial shifting movement of the first gear toward the second gear to provide an initial pressure engagement between the synchronizer drum and the friction surface on the second gear thereby to rotate the synchronizer drum to the limit of its angular movement on the driven shaft to thereby effect synchronization between the gears, said spring yielding upon synchronization of the gears and the aperture permitting the blocker stub to pass therethrough to thereby permit engagement of the gears upon further shifting movement of the first gear.

4. A transmission according to claim 3 wherein said aperture has a chamfered entrance providing chamfered blocker faces and the terminal end of said blocker stub is wedge-shaped to provide a pair of correspondingly beveled blocker faces, and the blocker stub has a cam surface formed adjacent the terminal end and arranged to engage the resilient means carried by the first gear prior to engagement being effected between either of the chamfered blocker faces and either of the bevel blocker faces.

5. A transmission including a driven shaft, a first gear rotatable with said driven shaft and axially shiftable thereon, a second gear rotatable on said driven shaft and adapted to be engaged by said shiftable first gear, a synchronizer drum splined for limited rotation on said driven shaft and disposed between said two gears for establishing synchronization therebetween, a friction surface on said second gear being frictionally engaged by the synchronizer drum to effect synchronization, at least one blocker stub fixed to said synchronizer drum and extending therefrom toward said first gear, said first gear having a correspondingly positioned aperture formed therein and arranged to receive the blocker stub upon said first gear meshing with said second gear, a wire-like tension spring extending across the entrance to said aperture and located so as to partially obstruct said aperture, said spring being engagable by the terminal portion of said blocker stub and placed under tension during initial shifting movement of the first gear toward the second gear to provide an initial pressure engagement between the synchronizer drum and the friction surface on the second gear thereby to rotate the synchronizer drum to the limit of its angular movement on the driven shaft.

6. A transmission according to claim 5 wherein the entrance to said aperture is chamfered to provide an inclined surface, and the terminal end of said blocker stub is correspondingly inclined to provide a cooperating blocker face and the blocker stub has a cam surface formed thereon intermediate the terminal end thereof and the synchronizer drum and arranged to engage the spring carried by the first gear during initial shifting movement of the gear, the cam surface being so located with respect to the inclined blocker face at the terminal end of the stub and the inclined surface at the entrance to the aperture in the gear being so located with respect to the cam surface engaging portion of the wire spring that when the wire spring bears against the cam surface, the blocker surface at the terminal end of the blocker stub does not engage the inclined surface at the entrance of the aperture.

PALMER ORR.

REFERENCES CITED

The following references are of record in the file of this patent:

UNITED STATES PATENTS

| Number | Name | Date |
|---|---|---|
| 2,048,883 | Murray | July 28, 1936 |
| 2,275,718 | Beringer | Mar. 10, 1942 |
| 2,369,842 | Neracher et al. | Feb. 20, 1945 |
| 2,397,344 | Fishburn | Mar. 26, 1946 |